(No Model.) 2 Sheets—Sheet 1.
I. H. DAVIS.
BICYCLE TRAINER.
No. 584,989. Patented June 22, 1897.
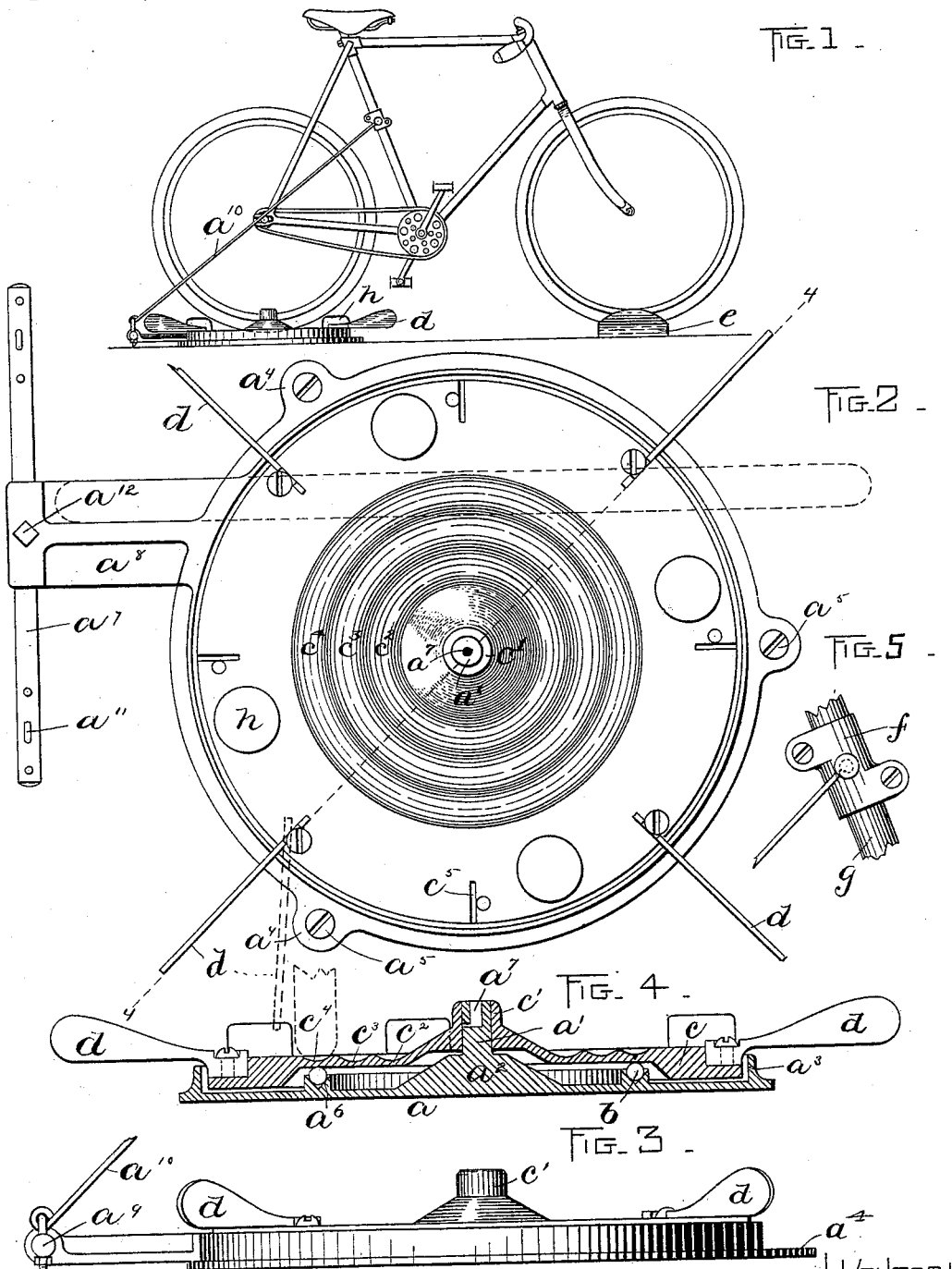
WITNESSES:
A. D. Harrison.
P. W. Pezzetti.
INVENTOR:
I. H. Davis
by Wright Brown & Quinby
attys.

(No Model.)  2 Sheets—Sheet 2.
I. H. DAVIS.
BICYCLE TRAINER.
No. 584,989.  Patented June 22, 1897.
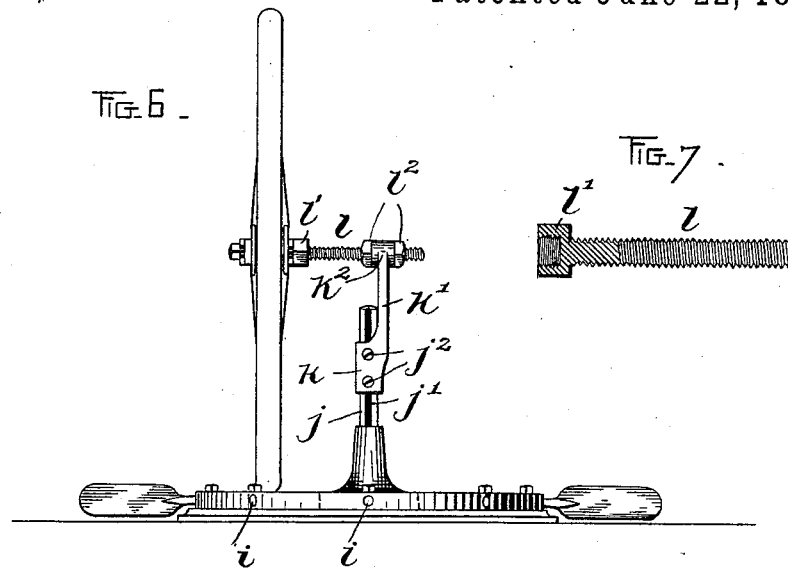
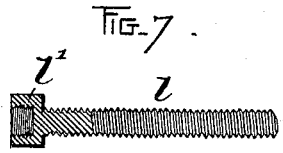
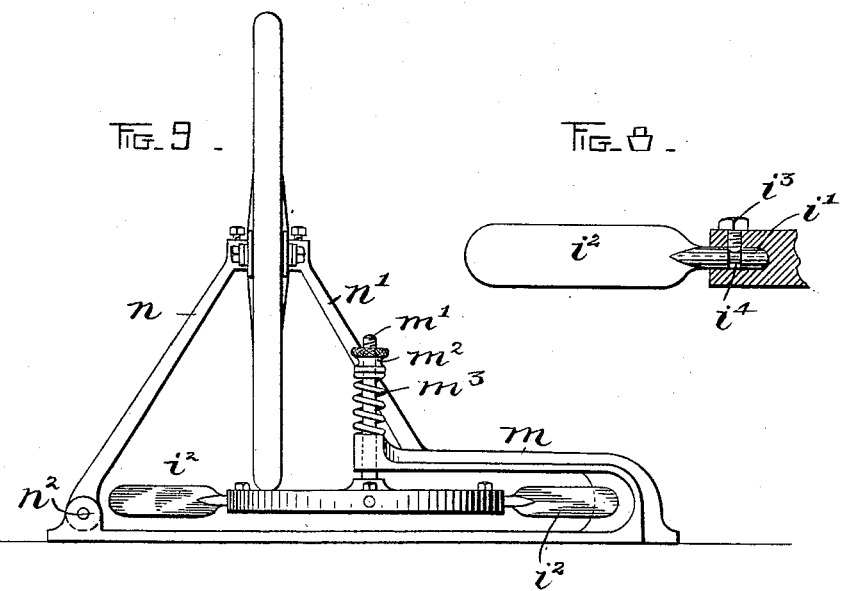
WITNESSES:
A. D. Harrison.
P. W. Pezzetti.
INVENTOR:
I. H. Davis
by Wright Brown & Quinby
Attys

UNITED STATES PATENT OFFICE.

ISAAC H. DAVIS, OF BOSTON, MASSACHUSETTS.

BICYCLE-TRAINER.

SPECIFICATION forming part of Letters Patent No. 584,989, dated June 22, 1897.

Application filed November 20, 1896. Serial No. 612,897. (No model.)

*To all whom it may concern:*

Be it known that I, ISAAC H. DAVIS, of Boston, in the county of Suffolk and State of Massachusetts, have invented certain new and useful Improvements in Exercising-Machines for Bicycles, of which the following is a specification.

This invention relates to "home trainers" or machines employed by bicycle-riders for exercising purposes and which may be used in connection with a stationarily-mounted bicycle for imparting a resistance to the driving-wheel, so that a rider seated on the bicycle and turning the pedal-cranks will be compelled to expend the same effort and muscular exertion as though he were propelling the bicycle along the road. Heretofore, so far as I am aware, machines of this character have been constructed so as to retard the rotation of the driving-wheel by an adjustable friction device operating with a constant pressure and not varying materially with the changes of speed, so that the friction remained constant under all speeds without increasing, as it would were the machine traveling along a road. Hence the object of this present invention is to add such improvements to machines of the character specified that the rider will have to exert practically the same amount of strength in substantially the same way that he would were the bicycle being used in road-riding—that is, so that the rider will be compelled to increase his exertion and muscular efforts in a direct ratio with the speed at which the driving-wheel is revolved.

Again, another object of the invention is to equip a machine of the character specified with a movable member having a practically straight smooth surface similar to a road or floor, so that the bicycle will be under the ordinary conditions experienced when in common use and the tire will not be subjected to a sudden or injurious strain.

Another object of the invention is to provide a machine constructed in such way that the momentum and the atmospheric resistance of the moving member increase with a positive ratio according to the increase in speed.

A further object is to provide simple devices which may be easily attached to and detached from or adjusted upon the moving member of the machine for creating an artificial air resistance which may be regulated to suit each individual rider or which may be regulated so as to equal the resistance met with by the rider in propelling his bicycle along an ordinary road or in driving it up an incline.

Still another object of the invention is to provide the machine with means for holding an ordinary bicycle upright thereon and adjusting it relatively thereto, so as to vary the amount of force necessary to overcome the inertia of the movable part thereof and to vary the momentum of the same.

To these ends my invention consists of a machine of the character specified so constructed as to vary the resistance of the driving-wheel of the bicycle in accordance with the speed at which the said wheel is being revolved, whereby the momentum and atmospheric resistance increase according to the increase in speed.

The invention likewise consists of a device or machine of the character specified provided with means for increasing or decreasing the atmospheric resistance in accordance with the size or strength of the rider and also for adjusting the machine in such way that the momentum of the movable parts may be made equal to any given weight of rider and bicycle.

It further consists of a machine provided with a movable member having a series of detachable or adjustable fan blades or vanes for creating an artificial air resistance which can be regulated at will.

The invention also consists of a machine of the character specified having a moving member and also having means for adjusting the bicycle, so as to require a greater or less exertion of the rider to overcome the inertia of the said member or to vary the momentum of the same; and it likewise consists of such a machine provided with a rotatable table arranged horizontally and rotating about a vertical axis, and also provided with means for maintaining the bicycle upright and stationary with the drive-wheel resting upon the said table.

The invention also consists of a machine equipped with those other features of improvement which I shall now proceed to describe in detail and then point out in the claims hereto annexed.

Reference is to be had to the annexed drawings, and to the letters marked thereon, forming a part of this specification, the same letters designating the same parts or features, as the case may be, wherever they occur.

Of the drawings, Figure 1 is a side elevation of a bicycle with which one form of my improved machine is shown as in position to be operated. Fig. 2 is a plan view of the machine somewhat enlarged, the rear or driving wheel of the bicycle being indicated by dotted lines. Fig. 3 is a side elevation of the same. Fig. 4 is a section on the line 4 4 of Fig. 2. Fig. 5 illustrates a clamp which is secured to one of the stationary parts of the bicycle for maintaining the latter in an upright position upon the machine. Fig. 6 illustrates in front elevation another embodiment of my invention. Fig. 7 shows partially in section the screw which holds the bicycle upright upon the machine. Fig. 8 illustrates in detail a portion of the rotatable table and one of the adjustable vanes. Fig. 9 illustrates still another embodiment of my invention in which the rotatable table is yieldingly supported.

My invention may be embodied in many forms, several of which are illustrated upon the drawings. Referring to Figs. 1 to 5, inclusive, I employ a suitable base $a$, having a central upright bearing or stud $a'$, strengthened by a beveled boss $a^2$. Preferably in this embodiment of the invention the base is circular in plan view with an outer flange $a^3$ and with ears $a^4$, by means of which it may be secured to the floor by screws or bolts $a^5$. The base is also formed with a circular track $a^6$, concentric with the stud $a'$ to receive antifriction-balls $b$, upon which rests a table $c$. The said table is also circular and fits snugly within the flange $a^3$ of the base, being provided with a hub $c'$, surrounding the stud $a'$, so that the table will revolve therearound, as will be understood.

For lubricating purposes the stud $a'$ is provided with an oil-duct $a^7$, which leads to its exterior, so as to supply oil to the hub $c'$.

The table is formed with three or more concentric grooves $c^2$ $c^3$ $c^4$ and is provided at its edges with radial slots $c^5$, in which may be secured fan blades or vanes $d$, there being screws $d'$ for securing the last-named parts in place.

The front wheel of the bicycle is supported in a suitable support or bearing-block $e$, attached to the floor in any desired way, as shown in Fig. 1, with the rear driving-wheel resting in one of the grooves $c^2$, $c^3$, or $c^4$, the vertical plane of the said wheel being at right angles to the table and at a tangent to a circle circumscribed about the center of the said table. The base is formed with a projecting arm or bar $a^8$, with which is connected the bicycle-supporting frame, consisting of a cross-brace $a^9$, projecting laterally through it on both sides, and links or braces $a^{10}$, being connected to eyes $a^{11}$, secured in any one of a series of apertures in the bar $a^9$ and having their forward converging ends connected to a sleeve or clamp $f$, said clamp being secured to one of the stationary parts of the bicycle-frame, preferably to the upright bar $g$, which connects the opposite angles of a diamond frame.

When the bicycle is placed in position upon the machine, the rider may seat himself upon the saddle and the crank-shaft may be revolved by means of the cranks and pedals in the ordinary way, the braces $a^{10}$ extending backward in such way as not to interfere with the movement of the feet or limbs of the rider.

When the wheel of the bicycle is rotating, the table is revolved thereby at a high rate of speed, the groove in which the wheel is placed determining the rate of speed of the table. That is to say, if the rider is of comparatively light weight and it is desired to decrease the amount of force necessary to overcome the inertia of the table the driving-wheel is placed in the groove $c^4$, which groove is farthest from the axis of the table, so that the wheel exerts the greatest leverage. But if the rider is of greater weight the wheel may be placed in either the groove $c^3$ or the groove $c^2$, the bar $a^9$ being adjustable in the bar $a^8$ to permit this, and there being means, as the set-screw $c^{12}$, for securing the bar $a^9$ after adjustment.

Instead of adjusting the wheel upon the table for varying the momentum of the latter I may employ removable weights $h$, of which there may be as many as may be desired. They may be secured upon the table in any suitable or convenient fashion, being illustrated only conventionally in Figs. 1, 2, and 4.

The number of the fan blades or vanes attached to the table may be varied, so as to vary the amount of physical exertion required to revolve it, or else they may be placed at an inclination, as shown by dotted lines in Fig. 2.

In Figs. 6 and 7 I have illustrated a somewhat simple embodiment of the invention in which the fan blades or vanes are adjusted about their longitudinal axes and in which I attach the axle of the driving-wheel of the bicycle to the stud extending up from the base of the machine.

The base of the machine is formed without a marginal flange, and the table has a series of radially-arranged apertures $i$, in which are inserted the stems $i'$ of the vanes $i^2$. A set-screw $i^3$ is arranged to take into a groove $i^4$ in each stem, so as to hold the vane in any desired position. When the vanes are vertical, they offer the greatest surface to the air, but when they are horizontal the resistance of the air against them is practically very small, it being possible to arrange them at an inclination to obtain any desired resistance. The stationary stud is extended, as at $j$, and is provided with a longitudinal groove $j'$ to receive the set-screws $j^2$, which are passed through a sleeve $k$, having an arm $k'$ with a bearing $k^2$ at the upper end of it. The sleeve may be adjusted vertically to any desired height and then secured in place by the set-screws $j^2$, which also prevent the sleeve and the arm from turning around the stud.

In placing the bicycle upon the machine its step-pin is unscrewed, and on the end of a screw which projects from the rear axle is screwed the internally-threaded end $l$ of a screw $l'$, passed loosely through the bearing $k^2$ and locked in place by two lock-nuts $l^2$. Thus the axle of the rear wheel is maintained radially of the table and in an easy and convenient manner without the employment of a frame such as hereinbefore described.

In Fig. 9 I have illustrated a form of my invention in which the table is yieldingly supported. In this case the base is formed with an overhanging arm $m$, constituting at its end a bearing to receive a screw $m'$, on the lower end of which the table is supported and upon the upper end of which is placed an adjustable nut $m^2$. Between the nut and the bearing and around the screw $m'$ is arranged a strong helical spring which holds the table against the wheel with a yielding pressure. The bicycle is supported and braced by two braces $n$ $n'$, the latter extending up from the arm $m$ and the former being hinged, as at $n^2$, to the base of the machine.

From the foregoing it will be seen that the atmospheric resistance increases in proportion to the speed, just as it does when a rider is propelling his bicycle along a road, and by removing all of the vanes or blades or adjusting them to lie horizontally the atmospheric resistance may be reduced to zero, and by adding blades or arranging them at an inclination the resistance may be increased as desired. It will be also observed that the surface upon which the wheel is placed is practically flat and is similar in all respects to a road, so that the tire is not strained or rendered liable to injury, as would be the case were it placed on a roll supported on a horizontal axis or were the point of contact small. Again, the momentum may be varied to suit any particular rider, as hereinbefore described.

The machine is simple in construction, takes up but small room, and can be manufactured at a relatively low cost. It is not liable to get out of order and will not tilt or have any of its parts displaced, since the point of contact between the wheel and the table is at all times practically over the line of antifriction-balls $b$ or between the said line and the center of the disk.

It will be understood that the stationary support for the front wheel of the bicycle may consist of the block shown or of the floor or ground itself, since the whole object of a support is merely to maintain the front wheel in position off the table as the rear wheel is revolved.

Having thus explained the nature of the invention and described a way of constructing and using the same, though without attempting to set forth all of the forms in which it may be made or all of the modes of its use, I declare that what I claim is—

1. A machine of the character specified, comprising in its construction, a stationary support for one wheel of the bicycle, a horizontal revoluble table for the drive-wheel of the bicycle, and means for retarding the revolutions of said table.

2. A machine of the character specified, comprising in its construction, a stationary support for one wheel of the bicycle, a horizontal table for the drive-wheel of the bicycle, and means for increasing the atmospheric resistance against said table.

3. A machine of the character specified, comprising in its construction, a stationary support for one wheel of the bicycle, a horizontal revoluble table for the drive-wheel of the bicycle, and a series of fan-blades secured to said table to increase the atmospheric resistance against the same.

4. A machine of the character specified, comprising in its construction, a stationary support, for one wheel of the bicycle, a horizontally-arranged revoluble table for the drive-wheel of said bicycle, and a series of fan-blades adjustably secured to said table.

5. A machine of the character specified, comprising in its construction, a base, a horizontal revoluble table for the drive-wheel of the bicycle, and means for maintaining the bicycle in an upright position with the drive-wheel at right angles to the surface of the table and at a tangent to a circle circumscribed about the center of the table.

6. A machine of the character specified, comprising in its construction, a base, a horizontal revoluble table having concentric grooves, and means for maintaining the bicycle upright with the drive-wheel in any one of said grooves.

7. A machine of the character specified, comprising a base having a central vertical bearing, a table revoluble around said bearing, and adjustable means supported in the base for maintaining said bicycle in an upright position.

8. A machine of the character specified, comprising in its construction a circular base having a central bearing, a horizontal table revoluble around said bearing and having concentric grooves in its surface, and fan-blades attached to the said table.

9. A machine of the character described comprising in its construction a horizontally-arranged revoluble disk to which power is imparted from the bicycle-wheel, and vanes attached to said disk for creating an artificial resistance.

10. A machine of the character described, comprising in its construction a revoluble disk, a base having a stud around which said disk rotates, and means attached to said stud and to the axle of the driving-wheel of the bicycle for holding the latter upright.

11. A machine of the character described comprising in its construction a revoluble disk having a series of radial apertures, and driven by the bicycle-wheel, of a series of vanes secured in said apertures, said vanes being adjustable therein about their longitudinal axes.

In testimony whereof I have signed my name to this specification in the presence of two subscribing witnesses, this 16th day of November, A. D. 1896.

ISAAC H. DAVIS.

Witnesses:
A. D. HARRISON,
P. W. PEZZETTI.